Oct. 24, 1939.   P. MICHAEL   2,177,042
TIRE TREAD AND PRESSURE REGULATING DEVICE
Filed Dec. 14, 1935   3 Sheets-Sheet 1

Inventor:
Paul Michael
Attorneys:
Bailey & Parson

Oct. 24, 1939.    P. MICHAEL    2,177,042
TIRE TREAD AND PRESSURE REGULATING DEVICE
Filed Dec. 14, 1935    3 Sheets-Sheet 2

Inventor:
Paul Michael
Attorneys:

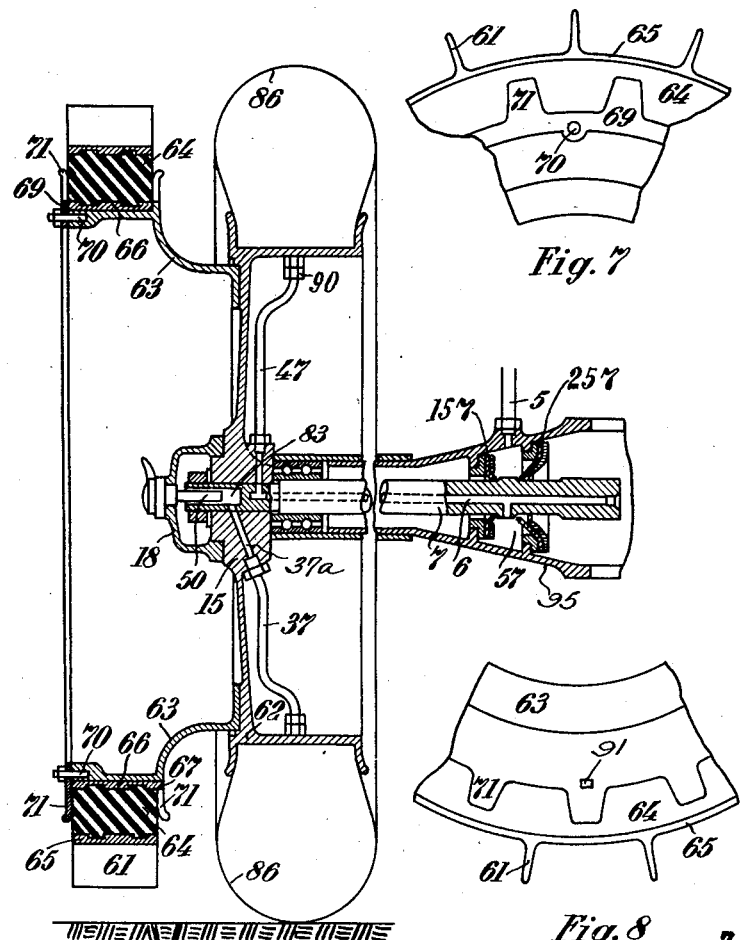

Patented Oct. 24, 1939

2,177,042

UNITED STATES PATENT OFFICE 2,177,042

TIRE TREAD AND PRESSURE REGULATING DEVICE

Paul Michael, Erfurt, Germany

Application December 14, 1935, Serial No. 54,508
In Germany December 19, 1934

16 Claims. (Cl. 152—416)

The present invention relates to vehicle wheels, equipped with pneumatic tires, and it is an object of the invention to increase the tread surface of the tire, when running over sandy or soft ground or road, to increase consequently the adhesion of the wheel and to diminish the pressure per square inch of the tread surface on the road. This purpose is fullfilled according to the invention by lowering the air pressure in the tire from a high value to a lower value and by limiting automatically the low pressure to a predetermined minimum amount.

In one form of the invention the pneumatic wheel tire is combined with a spiked grouser rim or rims arranged adjacent the pneumatic tire and being normally disengaged from the road. When however the vehicle is running on an iced road, the pressure in the air tire is according to the invention lowered and automatically limited to a predetermined value, whereby the tread surface of the air tire is flattened out and the spikes or spades of the grouser rim are brought into engagement with the road, the adhesion of the wheel being simultaneously substantially increased. To accomplish the aforesaid objects a device is connected with the tire or tires and is governed either alone by hand or together with the respective members at the other wheels from a central point, whereby the tire can be brought into communication with the atmosphere or can be shut off from the same. According to the invention this member is controlled by a special automatically working closing member, which automatically checks the communication between the tire and the atmosphere, when the desired predetermined low pressure has been attained.

By lowering the pressure in the air tire to the predetermined value the tread surface of the tire is flattened out, so that the wheel will not sink deeply into sandy soil. When the wheel is equipped with an additional grouser rim or rims, the spikes or spades of the same are brought into engagement with the road for example in the case that the vehicle is running over an iced road. Thereafter each of said control members is returned to its original position or all members together are by a remote control returned into their original position, wherein they permit the reestablishing of the high pressure in the tire. By establishing the high pressure in the tire the grouser rims are disengaged from the road. According to the invention in governing the control members from a remote point, the same line leading from a pressure fluid tank to the control members, mounted on the wheels, is used for reducing the pressure in the tires as well as for increasing the pressure to its original value, and these purposes are both attained by differently stepping the pressure employed in the line.

At the point where the fluid passes from the stationary elements to the elements rotating with the wheel, the space between the stationary elements and elements rotating with the wheel is tightened off from the atmosphere only while the control members are being operated, i. e., while the line is under pressure, whereby permanent friction during the normal running of the vehicle and wear of the moving parts are prevented.

The grouser rim may be connected with the wheel body by elastic means, whereby the forces established in radial and tangential direction by the grouser rim striking against an obstruction on the road are elastically damped.

For explaining thoroughly the invention as it is illustrated in the appended drawings, for example by several forms of embodiments, in which—

Figs. 1 and 2 show sections of a multiple way valve to be mounted at the driver's seat of a vehicle arranged to control the increasing or the reducing of pressure in the tires from a remote point, Fig. 3 shows a device to be mounted on a vehicle wheel and arranged to be operated from a remote point for increasing the pressure in the tire respectively for reducing the pressure from a higher value and limiting it automatically to a predetermined minimum.

Fig. 5a shows the arrangement of a wheel as designed in Fig. 5 in combination with a grouser rim in its lifted position.

Fig. 6a shows the air tire, the tread surface whereof is flattened out in combination with the grouser rim engaging the road.

Figs. 7 and 8 show elevational side views of the grouser rim.

Figures 5, 6:
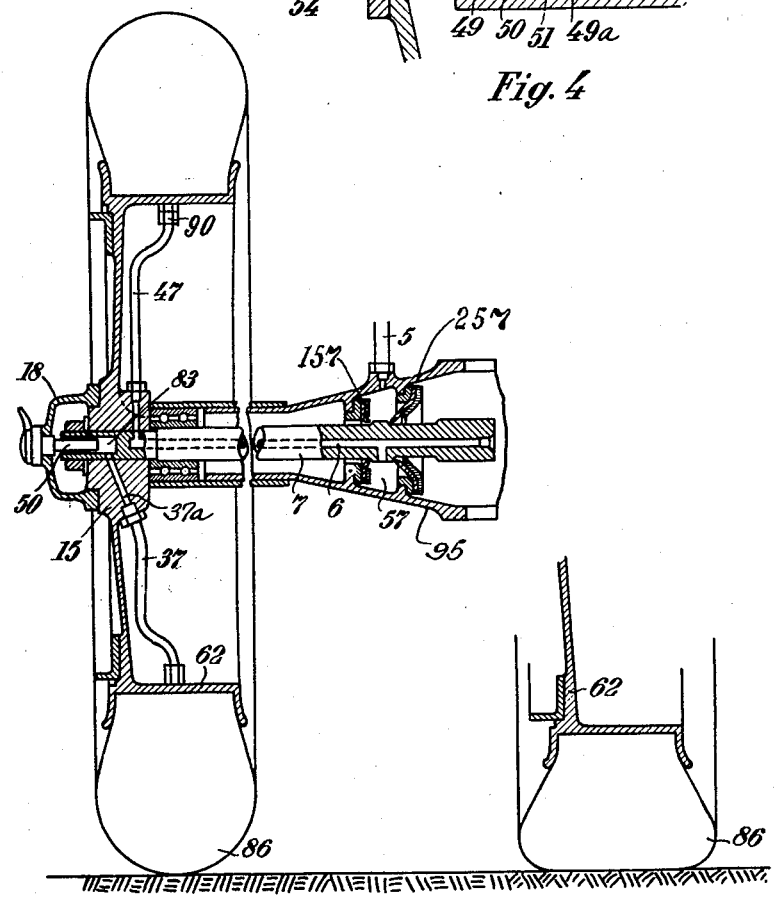
Fig. 5 shows the arrangement of a wheel in combination with conduits to inflate the tire from a pressure supply on the vehicle and with a device according to Fig. 4, the air tire being inflated with its full high pressure.
Fig. 6 shows the air tire, the tread surface whereof is flattened out.

The remote control device is operated by a remote control valve 1 (Figs. 1 and 2) mounted for example at the driver's seat. In dependency of the position which said control valve occupies, the pressure fluid flowing from a tank, mounted on the vehicle, through line 2 to the valve 1, passes either through branch tube 3 with full pressure or through branch tube 4 with reduced pressure into line 5 or does not enter line 5 at all. Line 5 leads to a pressure chamber 57 (Figs. 5 and 5a) arranged in this instance in the axle casing 95 and the space between the stationary casing and the rotating shaft 7 is tightened off by two gaskets 157 and 257 which are brought to contact with the rotating elements of the shaft only when pressure fluid is supplied through line 5 to said chamber, the fluid flowing therefrom into a longitudinal bore 6 in the shaft 7. In the case that shaft 7 is stationary, a similar pressure chamber may be formed within the wheel capsule 18. The pressure of the tank is reduced in the line 4 by a pressure reducing device 8 (Fig. 2) known in the art. When the valve 1 is in its central position, it disconnects the tank from line 5 and connects line 5 as well as the branch tubes 3 and 4, which are mutually connected in the cross-piece 9 with the atmosphere through branch tube 10 and channels 11 and 12 in the cock 1 and the bore 12a in the threaded plug 13. The fluid flows from the longitudinal bore 6 in the shaft (Fig. 3) through several bores 14 in the shaft 7 and boss 15 into the inner annular channel 16 in the boss flange and passes through bores in the gasket 16a into the annular channel 17 formed in the wheel cover 18. A channel 19 leads therefrom into the hollow space 22 of the cover 18, which is tightened with respect to the inner hollow space 20 of the cover by a gasket 21.

Figures 1, 2:
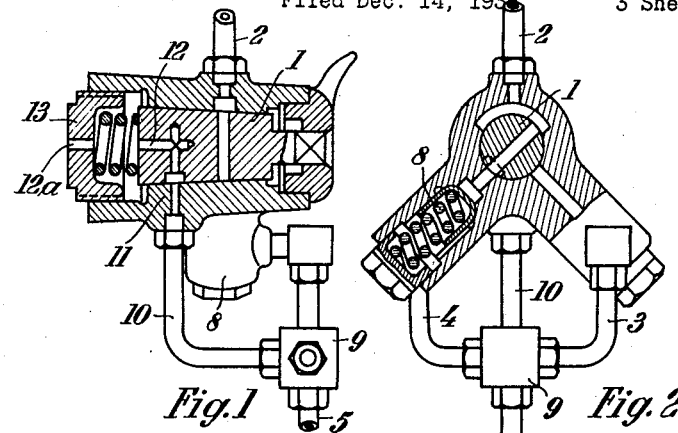

For reducing the full pressure in the tire the remote control valve 1 is set in such a manner that the fluid flows through the pressure reducing device 8 (Fig. 2). The hollow space 22 is filled with fluid of reduced pressure. A double seat valve 24 in the cover 23 is influenced by a spring 25, the pressure of which is so adjusted that the valve is not lifted by the reduced fluid pressure. A piston 26, tightened by a gasket, is thrust against a stop 27, whereby forcing a valve 28 from its seat. Accordingly the spring chamber 84 is connected with the atmosphere through slot 29, a bore 30 and a space 20, which is separated from the pressure space 22 by a gasket 21, through a bore 31, annular channels 32 and 33, channel 34 formed in the cover 23 and a bore 35 in a screw cap 36. Since the pressure in the tire is not yet reduced and since this pressure exists also in the space 83, connected permanently by means of line 37 and channel 37a with the tire 86 (Figs. 5, 5a), and since this pressure therefor exists also under the valve 38, the valve 38 is lifted and the pressure fluid is allowed to flow from the tire through slot 39 into the spring chamber and from this chamber into the atmosphere in the described manner, whereupon the pressure in the tire sinks. The spring 40 of the valve however is so adjusted, that the valve again closes, when the desired minimum pressure in the tire is attained. Thereupon the line 6 and also the space 22 over the piston 26 is deflated by setting the remote control valve 1 to its middle position, whereupon the piston 26 returns under the pressure of spring 40 and valve 28 returns to its seat, shutting off also the spring chamber from the atmosphere.

The adjusting of the spring 40 is performed in the following manner:

The base part 41 of the valve casing is threaded with shaft 7 and is secured against rotation on the shaft. The upper part 42 of the valve casing is threaded with part 41, whereby on rotation of the upper part 42 in either direction with respect to the base part 41, both parts are displaced longitudinally with respect to each other and the spring 40 is either compressed or expanded. The spring is adjusted by unscrewing the nut 43 and by lifting the cover 23 to a point, in which the noses 44 and 45 formed in the cover 23 and on the wheel capsule 18 are enabled to slide over one another. Rotation of the cover 23 is transmitted to the upper part 42 by means of fingers 46, permitting a relative longitudinal displacement of these parts, whereby the spring is adjustable in both directions. The aforesaid noses serve for preventing an unintentional rotation of the cover 23 and a resulting unintentional alteration of the tension of the spring 40, when tightening again the nut 43.

Figure 3:
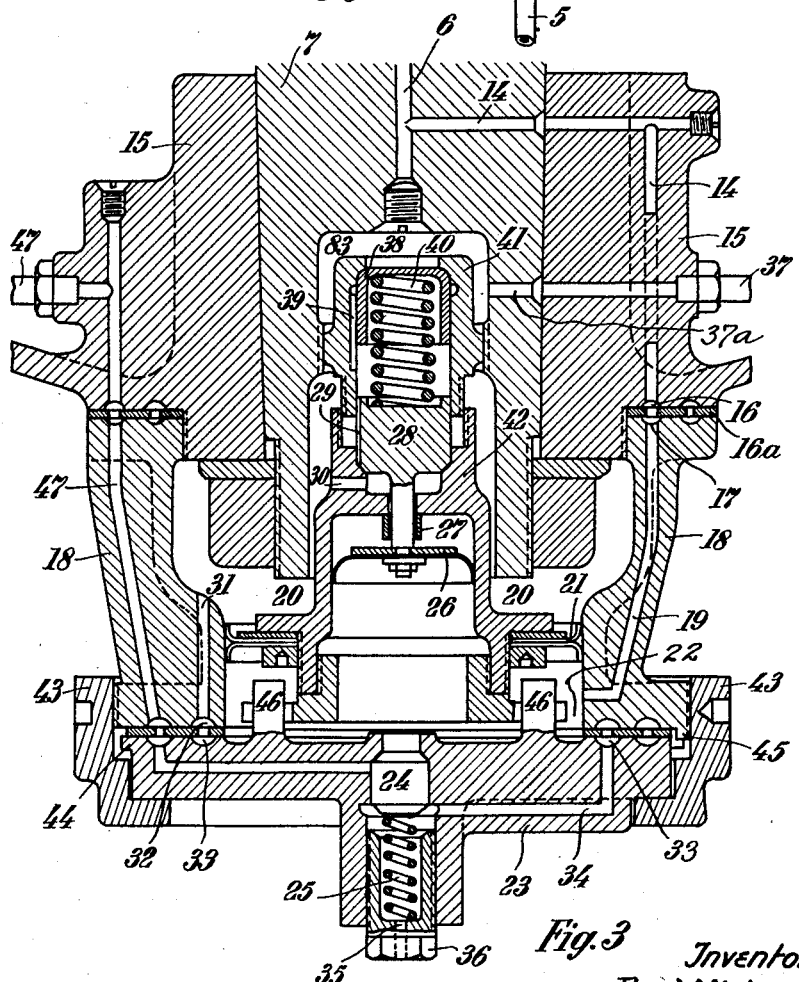

In order to reestablish the full pressure in the tire 86 the remote control valve 1 is moved into a position wherein the fluid of unreduced pressure of supply flows over the described path into the hollow space 22 of the wheel capsule 18. The pressure fluid operates in this space the valve 28 as above described and simultaneously forces the valve 24 in the cover 23 against its upper seat, the spring 25 being so adjusted, that while it is not influenced by the pressure reduced in the pressure reducing member 8, it is displaced by a somewhat higher pressure. Valve 24 in its lifted position opens the channel 47 leading to the tire valve 90 respectively to the tire 86 itself and closes simultaneously the way 35 leading into the free atmosphere. Although the valve 28 is opened simultaneously, valve 38 will at first remain closed under the action of the low pressure now ruling in the tire 86, since the spring 40 is correspondingly adjusted. When the high pressure supplied to the hollow space 22 is transmitted to the tire 86 through line 47 the low pressure in the tire increases gradually, whereby valve 38 is lifted because lines 47, 37 and channel 37a communicate with one another through the tire (Fig. 5, 5a) and the increased pressure also enters the space below the valve 38. With valves 8, 28 lifted, the increasing pressure supplied to the tire 86 through line 47 is prevented from escaping through line 37, 37a, slot 39, 29 on the described path, through bore 35 to the atmosphere, because this bore is closed by the lifted double seat valve 24. When the pressure below the valve 38 increases, the pressure in the spring chamber 84 increases in the same proportion, and by interrupting the supply of pressure fluid, the valve 38 will under the action of spring 40 return to its seat, because the pressures above and below the valve balance. When the pressure in the tire 86 has attained the desired height, the space 22 is evacuated by moving the remote control valve 1 into its middle position, wherein the line 5 and accordingly the space 22 of the wheel capsule 18 communicate with the atmosphere as above described. The piston 26 and the valve 28 return and the valve 24 opens the path 34 to the atmosphere, whereby also the space 20 is evacuated. In Fig. 3 the arrangement is illustrated with a shaft rotating with the wheel. An illustration of an arrangement of a shaft with wheels rotating on the shaft can be dispensed with, as only slight alterations of construction are necessary, which do not form the subject matter of this invention.

Figure 4:
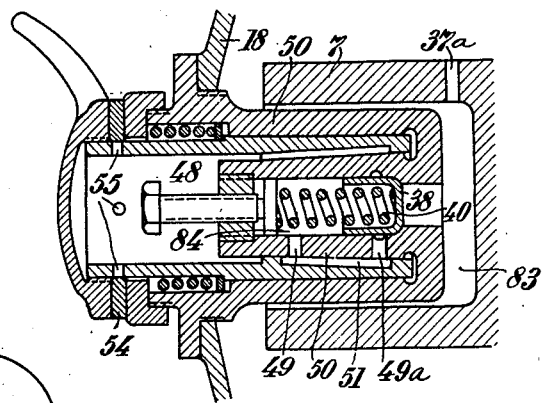
Fig. 4 shows a device to be mounted on a wheel, said device being operable manually and individually for reducing and automatically limiting the pressure in the tire to a predetermined minimum.

The remote valve control of Fig. 3 can be substituted by a device operated by hand and shown in Fig. 4, which also automatically limits the reducing of pressure to a predetermined adjustable height. The wheel capsule 18, in which the device is located, communicates permanently with the tire (Figs. 5, 5a) through line 37, and channel 37a whereby in the space 83 below the valve 38 (Fig. 4) the same pressure rules as in the tire. The spring 40 is by means of the adjusting screw 48 compressed to such an extent, that the valve 38 at the desired low pressure in the tire 86 is just held on its seat. When in passing over from low pressure to high pressure operation the pressure in the tire and consequently also the pressure below the valve 38 in the space 83 increases, the valve is lifted and the pressure fluid flows through the bores 49 and 49a in cock plug 50 and slot 51 in the cock member 52 also into the spring chamber 84 above the valve. When, after the desired high pressure has been attained, the supply of pressure fluid is interrupted, the valve 38 sits down again to its seat under the action of the spring 40. In order to change from high pressure to low pressure operation, the cock plug 52 is rotated to an amount at which the slot 53 comes into the position hitherto taken up by the slot 51, whereby the spring chamber 84 is connected to the atmosphere through the upper bore 49, slot 53 and the holes 55, which are protected against dust by a felt ring 54. The high pressure acting now only from the lower side of the valve 38, overcomes the effect of the spring 40, because it is adjusted only to low pressure, whereupon the valve 38 is lifted and the pressure fluid is allowed to escape from the tire through the slot 53, the holes 55 and the felt ring 54 into the atmosphere, until the desired low pressure is attained and the spring 40 closes the valve 38 and in consequence the outlet. When now the member 52 is returned into its original position, the device is again ready for passing over from low pressure to high pressure operation. According to the invention, the devices shown in Figs. 3 and 4 are shaped as bodies of revolution upon a common axis of revolution coinciding with the axis of the wheel, the movable members of the devices moving along said common axis, whereby the function of all parts of said revolving devices cannot be affected by centrifugal forces.

In the non-skid device to be operated by the devices above described the grouser rim 65 (Figs. 5a, 6a, 7, 8) is connected with the carrier 63, fixed to the wheel body 62, by means of an elastic intermediate member, for instance a solid ring of caoutchouc 64. This ring 64 is at its outer periphery firmly connected with the grouser rim 65 and on its inner circumference with an inner ring 66, by vulcanisation and/or by other suitable means. The non-skid rim 65 carries the spades or projections 61. The inner ring 66 is on the side facing the wheel furnished with projections 67 engaging corresponding recesses 91 in the flange of the carrier 63, whereby the non-skid device is secured against rotation relatively to the wheel 62. A cover ring 69 is by bolts 70 fixed to the carrier 63, thereby securing the non-skid device against lateral displacement. The carrier 63 as well as the cover ring 69 is provided with fingers 71, preventing the lateral turning out of the solid ring of caoutchouc under the action of lateral thrust when running with the non-skid rim in engagement with the road.

It is to be understood that the invention is adaptable for many uses for instance in connection with air tired wheels of motor vehicles, trail cars, tractors for agricultural and other purposes, the invention allowing selectively to increase the tread surface of air tire when running over soft or sandy ground or road and consequently to diminish the pressure per square inch of tread surface on road and to increase the adhesion of wheel. Further the invention enables in connection with air tire wheels equipped with one or two grouser rims, to engage or disengage selectively the grouser rim or rims with the ground or road when the vehicle or tractor is running on iced ground or road or is running on a road in normal state.

It is obvious to those skilled in art, that the invention can be realized in many other embodiments than those described and illustrated in the present specification and drawings.

Having now particularly described and ascertained the nature of the invention and in what manner the same is to be performed, I declare that what I claim is:

1. A tire pressure control system for vehicles having wheels with pneumatic tires, comprising in combination, on each wheel an outlet channel from the tire to the atmosphere, a valve in said outlet channel, a secondary valve in said outlet channel, a common spring biasing said valves whereby the first valve is closed at a predetermined minimum pressure in the tire and the secondary valve is maintained normally in a closed position, a chamber, a pneumatically operated opening means for said secondary valve arranged in said chamber and responsive to the pressure in said chamber, an external supply of variable pressure, a conduit to said chamber connected with said external supply of variable pressure, an inlet channel from said chamber to the tire, a valve member, a spring maintaining said valve member in normal position, said valve member being brought into its operating position by the pressure in the chamber, said valve member closing the inlet channel in its normal position and closing the outlet channel in its working position, said opening means being responsive to a lower pressure in the chamber than said valve member.

2. In combination with a vehicle having wheels equipped with pneumatic tires, a supply of high pressure fluid, governing means on the wheels for lowering the normal high pressure in the tires simultaneously but individually and automatically limiting the lowered pressure to a predetermined minimum amount and for increasing simultaneously and commonly the pressure of the tires to full pressure, a conduit connecting said means with the supply of high pressure fluid, a remote control operable in three positions in said conduit for governing the aforesaid means, a pressure reducing means, said remote control operating to supply in one position high pressure fluid into said conduit leading from said governing supply to said means on the wheel and to connect in another position said conduit with said pressure reducing means whereby reduced pressure is supplied to said governing means on the wheels, and to connect said conduit with the atmosphere in a third position.

3. In combination with a vehicle having wheels provided with pneumatic tires, governing means on the wheels and revolving with the wheels for selectively connecting each of all tires individually and directly with the atmosphere for lowering the normal high pressure in the tires for simultaneously but individually and automatically limiting the lowered pressure to a predetermined minimum amount and for selectively increasing simultaneously and commonly the pressure of the tires to full pressure, an external supply of high pressure fluid upon a non-rotating portion of the vehicle, and means for supplying pressure fluid from said pressure supply to said means revolving with the wheels, said second mentioned means connecting means comprising a conduit including a chamber arranged between a non-revolving part of the vehicle and a part revolving with the wheels, and gasket means for tightening said chamber against the revolving part, said gasket means being normally out of contact with said revolving part but being tightened against said revolving part only when pressure is established in said chamber from said pressure supply to operate said first means.

4. In combination, a vehicle having wheels provided with pneumatic tires, a pressure supply, governing means arranged on each wheel comprising at least one member movable in different positions, for selectively connecting at will its tire with the pressure supply in one position to inflate the said tire and for selectively connecting at will its tire directly and individually with the atmosphere in another position to lower its pressure, and governing means automatically limiting the low pressure thus obtained in the tire to a desired predetermined minimum amount when the pressure in the tire is lowered.

5. In combination, a vehicle having wheels provided with pneumatic tires, a pressure supply, governing means arranged on each wheel comprising means movable in different positions for selectively connecting at will its tire with the pressure supply in one position to inflate said tire and for selectively connecting at will its tire directly and individually with the atmosphere in another position to lower its pressure, said last means comprising a control member which is controlled by an adjustable spring, said control member being in the connection between the tire and the atmosphere, and operating automatically to interrupt said connection to limit the low pressure thus obtained in the tire to a predetermined minimum amount when the pressure in the tire is lowered.

6. In combination, a vehicle having wheels provided with pneumatic tires, a pressure supply, governing means arranged on each wheel for selectively connecting at will its tire with the pressure supply to inflate the same, governing means on each wheel for selectively connecting at will its tire directly and individually with the atmosphere to lower the pressure in the tire, said last means comprising means for automatically limiting the low pressure thus obtained in the tire to a desired predetermined minimum amount when the pressure in its tire is lowered, and power actuated remote control means for selectively operating said first and said second governing means on each wheel.

7. In combination, a vehicle having wheels provided with pneumatic tires, a pressure supply, governing means arranged on each wheel for selectively connecting at will its tire with a pressure supply to inflate the same, governing means on each wheel for selectively connecting at will its tire directly and individually with the atmosphere to lower the pressure in the tire, said last means comprising means for automatically limiting the low pressure thus obtained in the tire to a desired predetermined minimum amount when the pressure in its tire is lowered, and a pneumatic remote control means for selectively operating said first and said second governing means upon all wheels of the vehicle.

8. In combination, a vehicle having wheels provided with pneumatic tires, a pressure supply, governing means arranged on each wheel for selectively connecting at will its tire with the pressure supply to inflate the same, governing means on each wheel for selectively connecting at will its tire directly and individually with the atmosphere to lower the pressure in the tire, said second means comprising means for automatically limiting the low pressure thus obtained in the tire to a predetermined minimum amount when the pressure in its tire is lowered, said first means being responsive to high pressure and said second means being responsive to reduced pressure, and a pneumatic remote control means, said control means selectively delivering high pressure from said pressure supply to operate said first means and reduced pressure from said pressure supply to operate said second means.

9. In combination, a vehicle having wheels provided with pneumatic tires, a pressure supply, governing means responsive to high pressure arranged on each wheel for selectively connecting at will its tire with the pressure supply to inflate the same, and governing means responsive to reduced pressure on each wheel for selectively connecting at will its tire directly and individually with the atmosphere to lower the pressure in its tire, said second means comprising means for automatically limiting the low pressure thus obtained in the tire to a desired predetermined minimum amount when the pressure in its tire is lowered, conduit means connecting said first and said second governing means arranged on each wheel with the pressure fluid supply, a remote control means in such conduit means for delivering selectively high pressure from said pressure fluid supply through such conduit means to operate said first means on each wheel simultaneously and commonly, and reduced pressure through such conduit means from said pressure fluid supply to operate said second means, said conduit means being under pressure from said remote control means to said first and said second means only during the period when said first and said second means are selectively operated thereby.

10. In combination, a vehicle having wheels provided with pneumatic tires, governing means arranged on each wheel for selectively connecting at will its tire with a pressure supply to inflate the same, governing means on each wheel for selectively connecting at will its tire directly and individually with the atmosphere to lower the pressure in its tire, said last means comprising adjustable means responsive to a predetermined low pressure in the tire for automatically interrupting the further decreasing of the tire pressure when the same is lowered and has fallen to said predetermined low pressure, and a grouser rim arranged beside the tire, said grouser rim being dimensioned to have its grousers in engagement with the ground when the pressure in said tire is reduced to the predetermined minimum amount and out of engagement with the ground when the pressure in the tire is normal.

11. A tire pressure control system for vehicles having wheels with pneumatic tires comprising in combination on each wheel an outlet channel from the tire to the atmosphere, a valve in said outlet channel, a secondary valve in said outlet channel, at least one spring biasing said valves whereby the first valve is closed at a predetermined minimum pressure in the tire and the secondary valve is maintained normally in a closed position, a chamber, in said chamber a pneumatically operated opening means for said secondary valve, said means responsive to pressure in said chamber, an external supply of variable pressure, a conduit to said chamber connected with said external supply of variable pressure.

12. A tire pressure control system for vehicles having wheels with pneumatic tires comprising in combination on each wheel an outlet channel from the tire to the atmosphere, a valve in said outlet channel, a secondary valve in said outlet channel, at least one spring biasing said valves whereby the first valve is closed at a predetermined minimum pressure in the tire and the secondary valve is maintained normally in a closed position, a chamber, in said chamber a pneumatically operated opening means for said secondary valve, said means responsive to pressure in said chamber, an external supply of variable pressure, a casing, common to both valves and containing said spring, said casing comprising two portions threadedly engaged, whereby the tension of said spring may be varied by turning one of said portions of the casing relative to the other portions, a conduit to said chamber connected with said external supply of variable pressure.

13. A tire pressure control system for vehicles having wheels with pneumatic tires, comprising in combination, on each wheel an outlet channel from the tire to the atmosphere, a valve in said outlet channel, a secondary valve in said outlet channel, a common spring biasing said valves whereby the first valve is closed at a predetermined minimum pressure in the tire and the secondary valve is maintained normally in a closed position, a chamber, a casing common to both valves and containing said common spring, said casing comprising two threadedly engaged portions, one of said portions being movable from the outside of the chamber in which said casings are arranged to adjust the tension of the spring, in said chamber a pneumatically operated opening means for said secondary valve and responsive to pressure in said chamber, an external supply of variable pressure, a conduit to said chamber connected with said external supply of variable pressure, an inlet channel from said chamber to the tire, a valve member arranged in said chamber, a spring maintaining said valve member in normal position, said valve member being brought into its operating position by the pressure in the chamber, said valve member closing the inlet channel in its normal position and closing the outlet channel in its working position, said opening means being responsive to a lower pressure in the chamber than said valve member, and a gasket upon said movable portion of said casing dividing said outlet channel from said conduit.

14. A tire pressure control system for vehicles having wheels with pneumatic tires, comprising in combination on each wheel an outlet channel from the tire to the atmosphere, a valve in said outlet channel, a secondary valve in said outlet channel, a common spring biasing said valves whereby the first valve is closed at a predetermined minimum pressure in the tire and the secondary valve is maintained in a closed position, a chamber, a casing common to both valves and containing said common spring, said casing comprising two threadedly engaged portions, one of said portions being movable from the outside of said chamber in which said casings are arranged to adjust the tension of the spring, in said chamber a pneumatically operated opening means for said secondary valve and responsive to pressure in said chamber, an external supply of variable pressure, a conduit to said chamber connected with said external supply of variable pressure, an inlet channel from said chamber to the tire, a valve member arranged in said chamber, a spring maintaining said valve member in normal position, said valve member being brought into its operating position by pressure in the chamber, said valve member closing the inlet channel in its normal position and closing the outlet channel in its working position, said opening means being responsive to a lower pressure in the chamber than said valve member and a gasket, upon said movable portion of said casing dividing said outlet channel from said conduit, said chamber being arranged within and formed by the hub casing of the wheel.

15. A tire pressure control system for vehicles having wheels with pneumatic tires, comprising in combination on each wheel an outlet channel from the tire to the atmosphere, a valve in said outlet channel, a secondary valve in said outlet channel, a common spring biasing said valves whereby the first valve is closed at a predetermined minimum pressure in the tire and the secondary valve is maintained in a closed position, a chamber, a casing common to both valves and containing said common spring, said casing comprising two threadedly engaged portions, one of said portions being movable from the outside of said chamber in which said casings are arranged, in said chamber a pneumatically operated means for said secondary valve and responsive to pressure in the chamber, an external supply of variable pressure, a conduit to said chamber connected with said external supply of variable pressure, an inlet channel from said chamber to the tire, a valve member arranged in said chamber, a spring maintaining said valve member in normal position, said valve member being brought into its operating position by pressure in the chamber, said valve member closing in its normal position the inlet channel and closing in its working position the outlet channel, said opening means being responsive to a lower pressure in the chamber than said valve member and a gasket upon said movable portion of said casing dividing said outlet channel from said conduit, said chamber being arranged within and formed by the hub casing of the wheel, a rotatable cover for said hub casing for adjusting the tension of said common spring, a series of fluid pressure passages arranged partially in the hub casing and partially within said cover in a manner that in turning said cover respective to said hub casing the communications between said passages are not influenced.

16. In combination a vehicle having wheels provided with pneumatic tires, a pressure supply, governing means arranged on each wheel comprising at least one member movable in different positions, for selectively connecting at will its tire with the pressure supply in one position to inflate the said tire and for selectively connecting at will its tire directly and individually with the atmosphere in another position to lower its pressure, and governing means automatically limiting the low pressure thus obtained in the tire to a desired predetermined minimum amount when the pressure in the tire is lowered, said means governing the varying of the tire pressure at will comprising a series of springs and of members, all said members being shaped as solids of revolutions upon a common axis of revolution coinciding with the axis of the wheel, and a displacement of members being only possible along said common axis.

PAUL MICHAEL.